May 9, 1939.  F. E. WENGER  2,157,973
ELECTRICAL MEASURING INSTRUMENT
Filed Oct. 12, 1937
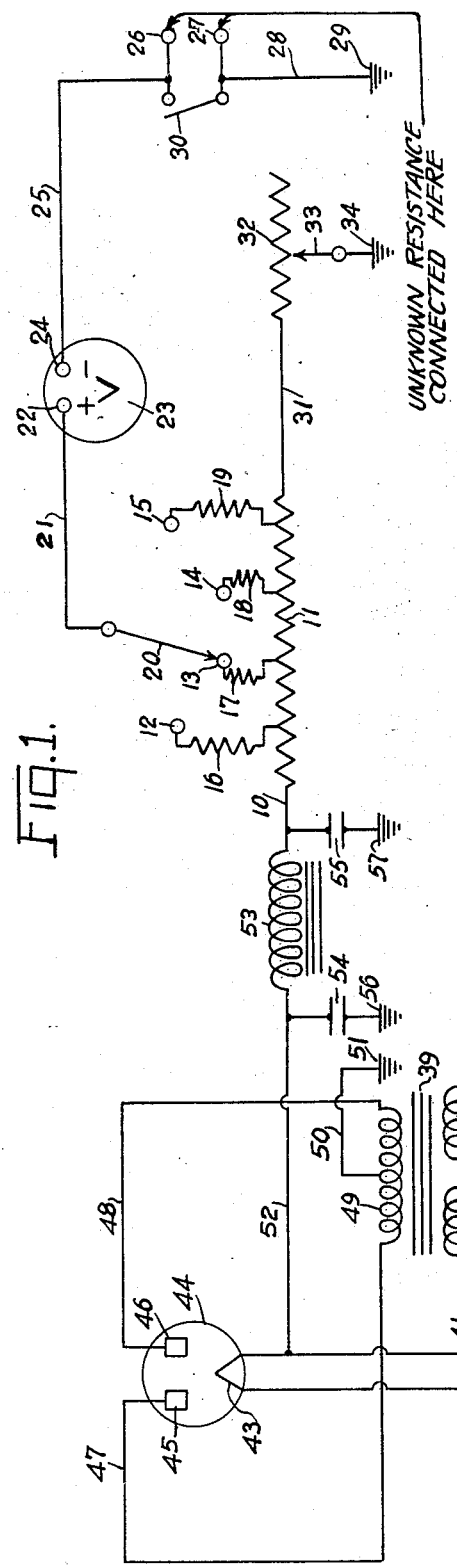
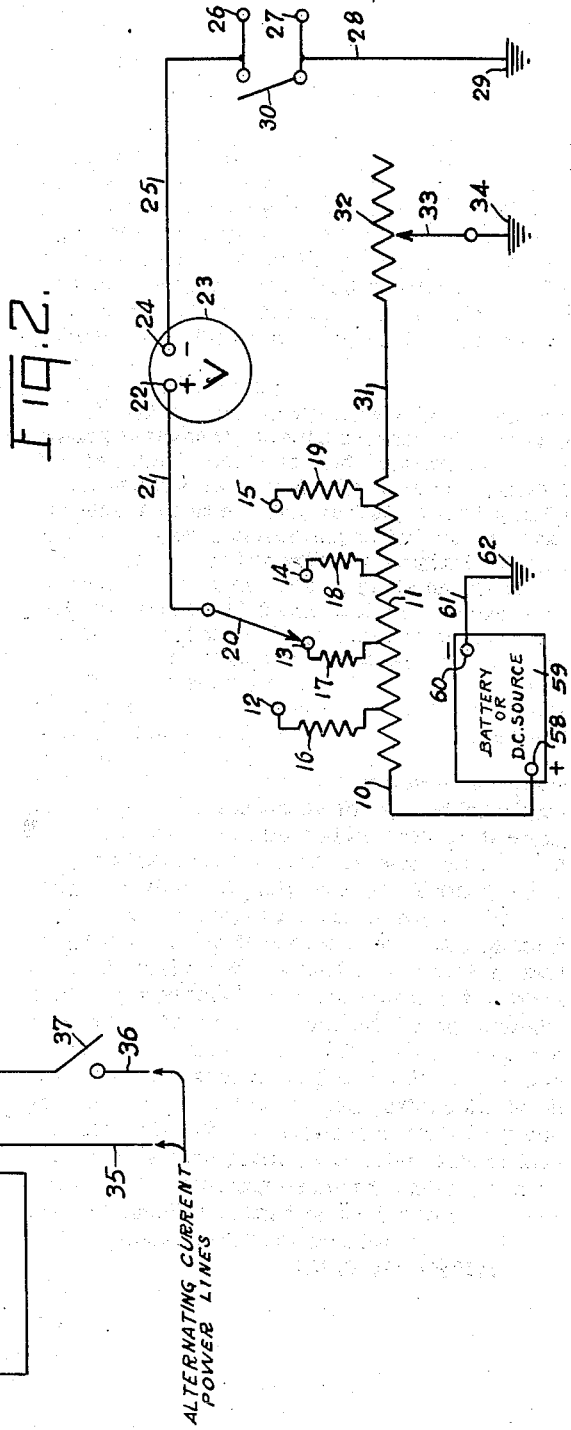
Inventor
FLOYD E. WENGER,
BY
Toulmin & Toulmin
Attorneys Patented May 9, 1939

2,157,973

UNITED STATES PATENT OFFICE 2,157,973

ELECTRICAL MEASURING INSTRUMENT

Floyd E. Wenger, Bluffton, Ohio, assignor to Ray L. Triplett, Bluffton, Ohio

Application October 12, 1937, Serial No. 168,643

4 Claims. (Cl. 171—95)

This invention relates to electrical measuring instruments, and in particular to ohmmeters for measuring resistances in electrical circuits.

One object of this invention is to provide an ohmmeter having means for compensating for variation in the operating current.

Another object is to provide a multiple-range ohmmeter with means for adjusting the zero position of the meter, in order to compensate for variations in the operating current without changing the zero adjustment when the range of the meter is changed.

Another object is to provide a multiple-range ohmmeter with a single zero adjuster for adjusting the zero position of the meter, in order to compensate for variations in the operating current without changing the zero adjustment of the meter when the range thereof is changed.

In the drawing:

Figure 1 is a wiring diagram of a multiple-range ohmmeter circuit with a single zero adjuster, the operating current for the circuit being obtained by rectifying alternating current.

Figure 2 is a circuit similar to Figure 1, employing a battery or other direct current source for the operating current.

In general, the electrical measuring instrument of this invention consists of a source of operating current, either direct current or rectified alternating current, connected to a voltage divider having a variable resistor associated therewith, and a voltmeter calibrated in ohms connected to taps taken off of the winding of the voltage divider. The adjustment of the single variable resistor serves to compensate for variations in the operating current, and enables the zero of the voltmeter to be reset without disturbing the adjustment for other ranges.

Hitherto, in multi-range ohmmeters a zero adjusting device has been provided for each range or else the adjusting means has required readjustment when changing ranges. The present invention eliminates these multiple zero adjustments and also eliminates the disadvantage of changing the zero settings for each range by providing a single adjustment, which is effective for all ranges.

Referring to the drawing in detail, Figure 1 shows a multi-range ohmmeter circuit including a positive current input line 10 connected to a voltage divider 11, having taps 12, 13, 14 and 15 taken off at various points thereon, these taps including series resistors 16, 17, 18 and 19. The number of taps may be any convenient number other than the four taps shown in the wiring diagram. The range tap switch arm 20 selectively engages the taps 12 to 15, inclusive, and is connected through the line 21 to the positive terminal 22 of the voltmeter 23, the negative terminal thereof being connected through the line 25 to the measuring terminal 26. The opposite measuring terminal 27 is grounded through the line 28, as for example, to the instrument case at 29. The switch 30 serves to short-circuit the measuring terminals 26 and 27 at the time when zero adjustments of the instrument are made. During measurements, however, the switch 30 is opened and the unknown resistance is connected across the measuring terminals 26 and 27. Connected to the opposite end of the voltage divider 11 from the positive current input line 10 is the line 31 leading to the variable resistor 32, having the slider 33 grounded, as at 34, such as to the instrument case.

In Figure 1 the positive current input line 10 and the negative current input line 28 receive current from an alternating current rectifying circuit. This circuit consists of the alternating current power lines 35 and 36, having a power switch 37, these lines being connected to the primary winding 38 of the transformer 39. The secondary winding 40 of the latter is connected by the lines 41 and 42 to the filament 43 of the full-wave rectifying tube 44, the plates 45 and 46 thereof being connected by the lines 47 and 48 to the secondary winding 49 of the transformer 39. The secondary winding 49 is grounded by the line 50 running from an intermediate point on the winding to the ground at 51, such as on the instrument case. From the filament line 41 the line 52 runs to the filter choke 53, the opposite end of which is connected to the positive current input line 10. The opposite ends of the filter choke 53 are connected to the filter condensers 54 and 55, the opposite sides of which are grounded as at 56 and 57.

In the arrangement shown in Figure 2 the positive current input line 10 is connected to the positive pole 58 of a battery or other direct current source 59, the negative pole 60 of which is connected by the line 61 to the ground or instrument case, as at 62.

In the operation of the circuit of Figure 1 the power switch 37 is closed, thereby connecting the primary winding 38 of the transformer 39 to the alteranting current mains. This causes a voltage to be applied across the plates 45 and 46 and filament 43 of the rectifier tube 44. This voltage is rectified in the rectifier tube 44 and flows from the filament 43, through the line 52, to the filter choke 53, where it is smoothed out by the filter choke 53 and the filter condensers 54 and 55. The current, which is of a positive character, continues through the positive current input line 10, the voltage divider 11, the line 31, the variable resistor 32, the slider 33 and the ground connection 34 to the ground connection 29, which is also connected to the center tap ground connection 51 of the transformer secondary winding 49, thereby completing the current path.

In the circuit of Figure 2 the course of the current is similar, except that it proceeds directly from the positive pole 58 of the battery, or other direct current source 59, through the positive current input line, along the route previously followed, the circuit being completed at the ground connection 62 and line 61 leading to the negative pole 60 of the battery, or other current source 59.

Each of the taps 12 to 15, inclusive, of the voltage divider 11 is calibrated to give a definite voltage drop so that there appears across each tap the required voltage for the operation of the meter 23 as an ohmmeter for the different ranges. To this end the taps of the voltage divider 11 are adjusted very carefully in order to give the correct voltage drop. The function of the resistors 16 to 19, inclusive, connected in series with the taps 12 to 15, inclusive, of the voltage divider 11, is to limit the current or drop in voltage which is used to actuate the meter 23 to such a value as will permit the meter 23 to read with a full scale deflection for each range.

For the first range the voltage available for operating the voltmeter appears between the tap 12 and the ground connection 29, the current passing from the tap 12, through the range tap switch 20, the line 21, the meter 23, the line 25, through the switch 30 and the line 28 to the ground connection 29. The switch 30 is closed during the preliminary adjustments of the meter before the actual measurement of the unknown resistance is attempted. The closing of the switch 30 short-circuits the terminals 26 and 27 for all zero adjustments of the ohmmeter, and provides for a continuity of circuit. Under these circumstances, the value of the current flowing through the meter 23 is determined by the voltage and the current limiting resistor 16.

The value of the resistor 16 can be calculated from Ohm's law. For example, when the voltmeter 23 consists of a 0–1 milliammeter of 100 ohms, and the voltage drop from tap 12 on the voltage divider to tap 15 is 120 volts, the value of the resistor 16 would be 119,900 ohms, according to Ohm's law. If the setting of the variable resistor 32 is altered by moving the slider 33, this changes the current which flows through the voltage divider 11, and in turn, changes the current across the taps 12 and 15. Under these circumstances, the meter 23 would read some value other than the full scale. Ohm scales are usually designed with ranges in multiples of ten. The next voltage step of the meter would be 12, this appearing between the tap 13 of the voltage divider 11 and the negative ground connection 29. This, for example, requires an 11,900-ohms resistor 17 in series with the tap 13 engaged by the range tap switch arm 20, and the action of the meter 23 would be the same as before.

In a similar manner, using a 10:1 ratio, the voltage divider 11 would be adjusted so that 1.2 volts will be developed across the tap 14 of the voltage divider 11 and the ground connection 29, whereupon the series resistor 18 would have a value of 1100 ohms. In a like manner, between the tap 15 of the voltage divider and the ground connection 29, with a proper adjustment of the taps of the voltage divider 11 a voltage of 1.2 volts would be developed between the tap 15 and the ground connection 29, whereupon the series resistor 19 would have a value of 20 ohms and the action would be the same as described above.

If, now, the voltage between the line 52 and the ground connection 29 changes, the current through the voltage divider 11 would also change, thereby giving incorrect voltage drops through the meter 23. In order to compensate for these current changes, the variable resistor 32 is adjusted by moving the slider 33 so that the total voltage between the line 52 and the ground connection 29 will be the same as that voltage for which the instrument was calibrated, whereupon the current value will be the same and the voltage drop across the taps 12, 13, 14 and 15 of the voltage divider 11 will be the same during calibration.

When the zero of the meter 23 is properly adjusted by moving the slider 33 of the variable resistor 32, the switch 30 is opened and the unknown resistance is connected across the terminals 26 and 27. The value of this unknown resistance in ohms is then read on the scale of the meter 23. As the unknown resistance reduces the current, the meter can be calibrated to read directly in ohms. When the meter 23 has been adjusted to its zero position, the setting does not have to be changed until the voltage of the operating current changes. The zero setting will thus remain correct for the different ranges of the instrument. The instrument of this invention, therefore, enables the setting of a multiple-range ohmmeter to zero for all the ranges of the instrument, provided that the taps of the voltage divider 11 have been very carefully adjusted in order to obtain the correct voltage drop. The correct current flowing through the voltage divider 11 thus gives the correct voltage drop used to operate the meter 23.

It will be understood that I desire to comprehend within my invention such modifications as come within the scope of the claims and the invention.

Having thus fully described my invention, what I claim as new and desire to secure by Letters Patent, is:

1. In a system for measuring the unknown magnitude of a resistance, a voltmeter, a range switch potentiometer resistor, and an adjustable resistor all connected in series with the resistance of unknown value, and means for applying a measuring voltage across the range switch potentiometer resistor and the adjustable resistor.

2. In a system for measuring the unknown magnitude of a resistance, the combination of a source of potential, an electrical measuring device, a fixed resistor provided with taps, a variable resistor, said fixed and variable resistors being connected in series with said source, a plurality of resistances connected respectively between said taps and a corresponding plurality of terminals, switching means for selectively contacting said terminals, the electrical measuring device, the resistance of unknown value and said variable resistor being connected in series with said switching means, said variable resistor being adapted to compensate for the fluctuations in the voltage of said source.

3. In a system for measuring the unknown magnitude of a resistance, the combination of a source of potential, a fixed resistor provided with taps, a variable resistor, and a voltmeter, said fixed and variable resistors being connected in series with said source, a plurality of range resistances connected respectively between said taps and a corresponding plurality of terminals, switching means for selectively contacting said terminals, the voltmeter, the resistance of unknown value and said variable resistor being connected in series with said switching means, said variable resistor being adapted to compensate for fluctuations in the voltage of said source, and said range resistances having magnitudes such as to provide full scale deflection on said voltmeter for encountered magnitudes of unknown resistance.

4. In a system for measuring the unknown magnitude of a resistance, a voltmeter, means for selectively changing the measuring range of said voltmeter, said means comprising a plurality of switch terminals and a corresponding plurality of resistors connected respectively to said terminals, said resistors terminating in a common potentiometer resistor, an adjustable resistor connected to said common potentiometer resistor, said voltmeter, switch terminals, resistors, and adjustable resistor all being connected in series with the resistance of unknown magnitude, means for applying a measuring voltage to said common potentiometer resistor, whereby said adjustable resistor serves to compensate for fluctuations in said voltage, and means for applying a known voltage to the resistance of unknown magnitude, said voltmeter serving to translate the current flowing through the resistance of unknown magnitude into ohmic measurement.

FLOYD E. WENGER.